(12) United States Patent
Choi

(10) Patent No.: US 8,751,892 B2
(45) Date of Patent: Jun. 10, 2014

(54) COMMUNICATION TERMINALS AND COMMUNICATION DEVICES

(75) Inventor: Hyung-Nam Choi, Hamburg (DE)

(73) Assignee: Intel Mobile Communications GmbH, Neubiberg (DE)

(*) Notice: Subject to any disclaimer, the term of this patent is extended or adjusted under 35 U.S.C. 154(b) by 206 days.

(21) Appl. No.: 13/205,769

(22) Filed: Aug. 9, 2011

(65) Prior Publication Data

US 2013/0039393 A1    Feb. 14, 2013

(51) Int. Cl.
*H04L 1/18*    (2006.01)

(52) U.S. Cl.
USPC ........... 714/749; 370/335; 370/338; 370/445; 370/447

(58) Field of Classification Search
USPC ........... 714/748–751; 370/335, 338, 445, 447
See application file for complete search history.

(56) References Cited

U.S. PATENT DOCUMENTS

| | | | |
|---|---|---|---|
| 2005/0243780 A1* | 11/2005 | Trainin et al. | 370/338 |
| 2007/0223405 A1 | 9/2007 | Jiang et al. | |
| 2009/0149191 A1* | 6/2009 | Luers | 455/456.1 |

FOREIGN PATENT DOCUMENTS

| | | |
|---|---|---|
| EP | 1748593 A1 | 1/2007 |
| EP | 1909425 A1 | 4/2008 |
| WO | 2006100597 A1 | 9/2006 |
| WO | 2008024340 A2 | 2/2008 |

OTHER PUBLICATIONS

RP-110436, 3GPP TSG-RAN Meeting #51, Kansas City, Kansas, USA, Mar. 15-18, 2011 "Further Enhancements to CELL_FACH", Agenda Item 14.1, pp. 1-14.
3GPP TS 25.331, V7.2.0, 3rd Generation Partnership Project; Technical Specification Group Radio Access Network; Radio Resource Control (RRC); Protocol Specification (Release 7), pp. 1-1306, Sep. 2006.
3GPP TS 25.214, V7.0.0, 3rd Generation Partnership Project; Technical Specification Group Radio Access Network; Physical layer procedures (FDD) (Release 7), pp. 1-60, Mar. 2006.
3GPP TS 25.321, V3.6.0, 3rd Generation Partnership Project; Technical Specification Group Radio Access Network; MAC protocol specification (Release 1999), pp. 1-40, Dec. 2000.

\* cited by examiner

*Primary Examiner* — Guy Lamarre
(74) *Attorney, Agent, or Firm* — Schwabe, Williamson & Wyatt, P.C.

(57) ABSTRACT

A communication terminal is provided comprising a transceiver configured to transmit data in accordance with a plurality of transmission processes wherein each transmission process may be activated or deactivated, a receiver configured to receive a message including a message field which specifies a number of transmission processes to which a request for transmission process activation or deactivation is to be applied and a controller configured to activate or deactivate the number of transmission processes in accordance with the request.

25 Claims, 17 Drawing Sheets

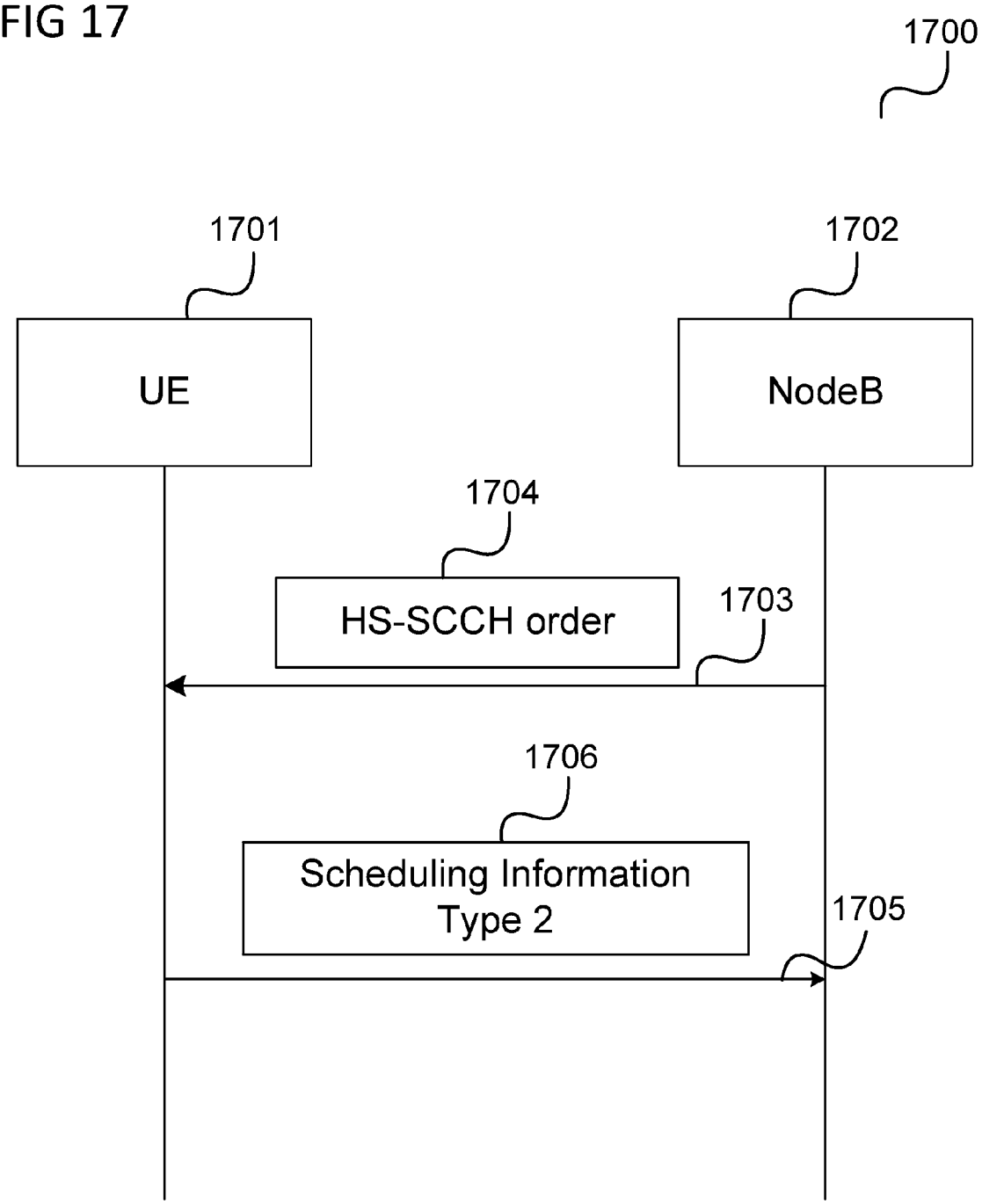

COMMUNICATION TERMINALS AND COMMUNICATION DEVICES

TECHNICAL FIELD

Embodiments generally relate to communication terminals and communication devices.

BACKGROUND

For communication between a communication terminal and a base station hybrid automatic repeat request (HARQ) may be used such that data transmission between the communication terminal and the base station is carried out in accordance with one or more HARQ processes. Efficient resource allocation in case of communication using HARQ processes is desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 17 shows a message flow diagram according to an embodiment.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
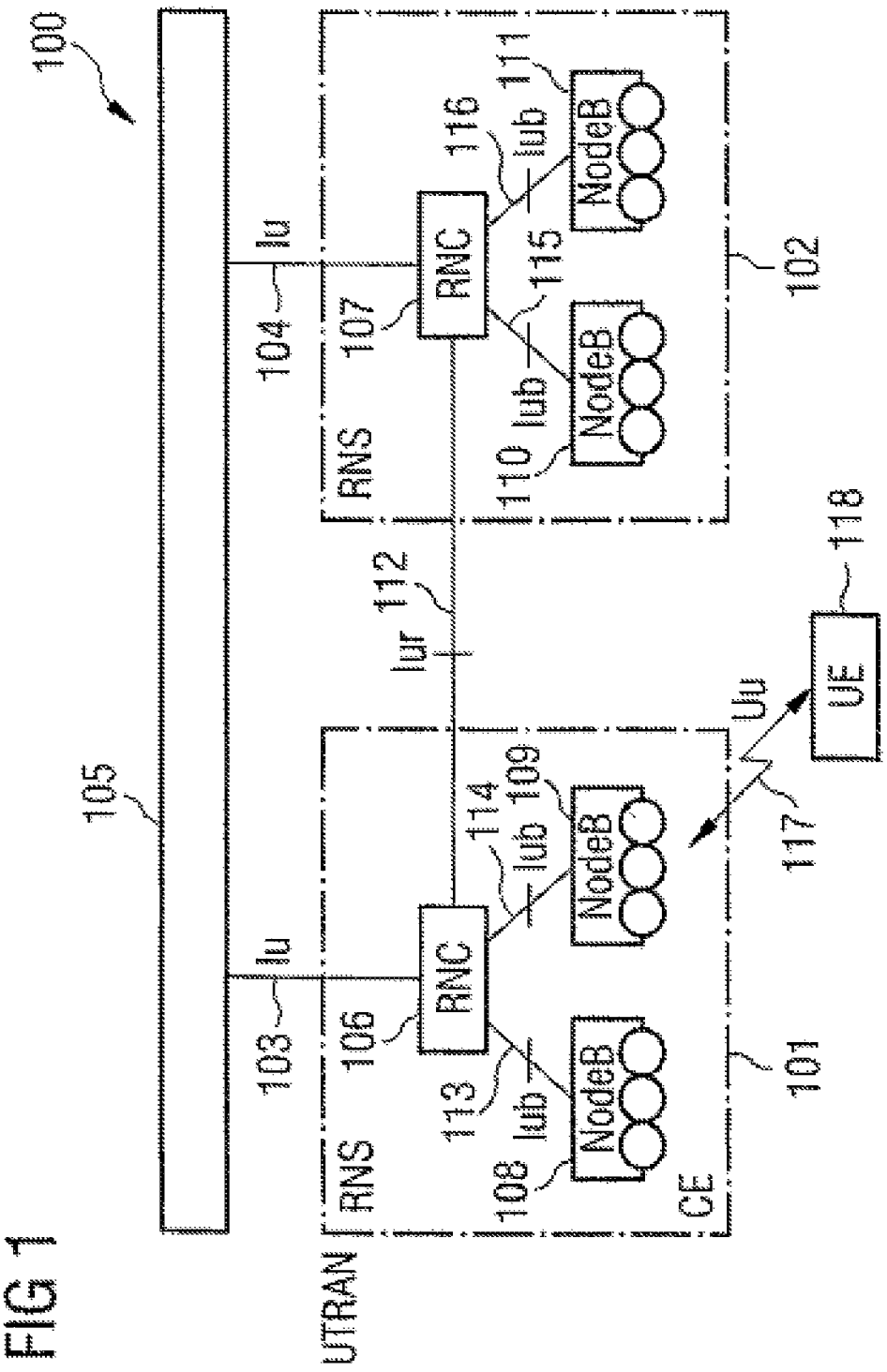
FIG. 1 shows a communication system according to an embodiment.

FIG. 1 shows a communication system 100 according to an embodiment.

The communication system 100 is a cellular mobile communication system (also referred to as cellular radio communication network in the following) including a radio access network (e.g. an UTRAN, UMTS (Universal Mobile Telecommmunications System) Terrestrial Radio Access Network), which has a plurality of mobile radio network subsystems (RNS) 101, 102, which are respectively connected to the UMTS core network (CN) 105 by means of what is known as an Iu interface 103, 104.

A mobile radio network subsystem 101, 102 respectively has a mobile radio network control unit (Radio Network Controller, RNC) 106, 107 and one or more UMTS base stations 108, 109, 110, 111, which are also called NodeB in line with UMTS.

Within the mobile radio access network, the mobile radio network control units 106, 107 of the individual mobile radio network subsystems 101, 102 are connected to one another by means of what is known as an Iur interface 112. Each mobile radio network control unit 106, 107 respectively monitors the allocation of mobile radio resources in all mobile radio cells in a mobile radio network subsystem 101, 102.

A UMTS base station 108, 109, 110, 111 is respectively connected to a mobile radio network control unit 106, 107 associated with the UMTS base station 108, 109, 110, 111 by means of what is known as an Iub interface 113, 114, 115, 116.

Each UMTS base station 108, 109, 110, 111 provides radio coverage for one or more mobile radio cells (CE) within a mobile radio network subsystem 101, 102. Control and user data are transmitted between a respective UMTS base station 108, 109, 110, 111 and a mobile terminal 118 (also referred to as UE, user equipment), in a mobile radio cell using an air interface, called Uu air interface 117 in line with UMTS, e.g. on the basis of a multiple access method.

According to one embodiment, for the efficient control of radio resources and communication connection between a communication terminal 118 and the radio access network (UTRAN) 101, 102, in accordance with UMTS based on W-CDMA (Wideband Code Division Multiple Access), five connection states are specified on the RRC (Radio Resource Control) protocol layer. The RRC states differ for the type of allocated resources, the activity of the communication terminal 118 and on which level the position of the communication terminal 118 is known to the radio access network.

Figure 2:
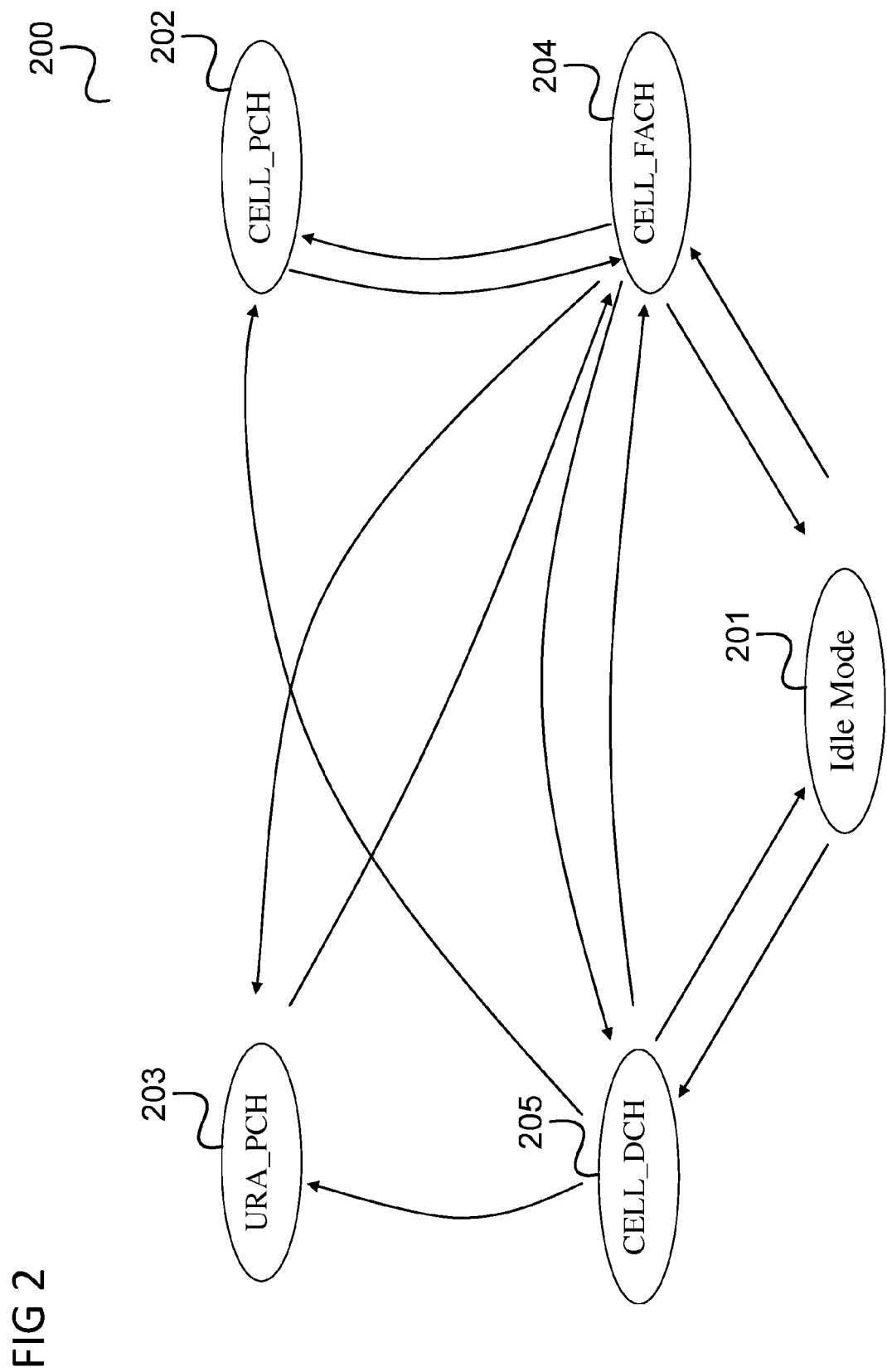
FIG. 2 shows a state diagram according to an embodiment.

The RRC states and the state transitions between the various states are illustrated in FIG. 2.

FIG. 2 shows a state diagram 200 according to an embodiment.

The state diagram 200 includes the RRC state Idle Mode 201, the RRC state CELL_PCH 202, the RRC state URA_PCH 203, the RRC state CELL_FACH 204, and the RRC state CELL_DCH 205.

Arrows indicate possible state transitions via the RRC states 201 to 205.

In RRC state Idle Mode 201 there is no signaling and data connection between the communication terminal 118 and the radio access network 101, 102. The position of the communication terminal 118 is known only in the UMTS core network at RA (Routing Area) or Location Area (LA) level. In Idle Mode 201 a communication terminal 118 can read the system information on BCH (Broadcast Channel) and can receive notifications on PCH (Paging Channel).

In RRC state CELL_PCH 202 there is a logical signaling connection between the communication terminal 118 and the radio access network 101, 102. In this state a communication terminal 118 can read the system information on BCH (Broadcast Channel) and can receive notifications on the PCH (Paging Channel). The position of the communication terminal 118 is known at radio cell area level.

The RRC state URA_PCH 203 is similar to the CELL_PCH 202, the difference is that the position of the communication terminal 118 is known at URA (radio access network 101, 102 Registration Area) level, i.e. at the level of a group of radio cells.

In RRC state CELL_FACH 204 there is a signaling connection and a data connection between the communication terminal 118 and the radio access network 101, 102. In this state only common resources can be allocated to a communication terminal 118 which are shared with other communication terminals 118 in the radio cell. The position of the communication terminal 118 is known at radio cell area level in this state.

In RRC state CELL_DCH 205 there is a signaling connection and a data connection between the communication terminal 118 and the radio access network 101, 102. In this state dedicated resources can be allocated to a communication terminal 118 and its position is known at radio cell area level.

In the Release 6 version of the 3GPP UMTS standard based on W-CDMA (Wideband CDMA) multiple access scheme the 3GPP (Third Generation Partnership Project) standardization for a introduced HSUPA (High Speed Uplink Packet Access) for improving significantly the packet data transfer performance of the uplink dedicated channel (DCH) in CELL_DCH state 205 and FDD (Frequency Division Duplexing) mode. In detail, the air interface was enhanced in terms of increased capacity and throughput, and reduced delay.

The improvements were achieved by introducing a new uplink dedicated transport channel denoted as enhanced DCH (E-DCH) that is subject to the following features: closed-loop power control, NodeB controlled scheduling, HARQ (Hybrid ARQ), and support of 2 ms and 10 ms TTI (transmission time interval) lengths. In physical layer the E-DCH is mapped to the E-DPDCH physical channel. For each E-DPDCH transmission an E-DPCCH physical channel is associated which carries E-DCH related control information. Further, for uplink closed-loop power control the DPCCH physical channel is used.

NodeB controlled scheduling denotes the possibility for a NodeB 108, 109, 110, 111 to control the E-DCH radio resource of a communication terminal 118. In detail, according to one embodiment, the NodeB 108, 109, 110, 111 transmits in downlink so-called scheduling grants which indicate to the communication terminal 118 the maximum allowed E-DPDCH/DPCCH power ratio. Two types of scheduling grants may be used:

i) Absolute Grants are sent on the physical channel E-AGCH (E-DCH Absolute Grant Channel) which provide an absolute limitation of the maximum allowed E-DPDCH/DPCCH (E-DCH Dedicated Physical Data Channel/Dedicated Physical Control Channel) power ratio the communication terminal 118 may use;

ii) Relative Grants are sent on the physical channel E-RGCH (E-DCH Relative Grant Channel) which provide a relative limitation of the maximum allowed E-DPDCH/DPCCH power ratio the communication terminal 118 may use (relative grant values may be "up", "hold" or "down").

As the scheduling grants can be sent once per TTI or slower the communication terminal 118 monitors the E-AGCH and E-RGCH physical channel every TTI (i.e. 2 ms or 10 ms).

In one embodiment, in accordance with UMTS, the E-DCH Absolute Grant Channel (E-AGCH) is a fixed rate (30 kbps, SF=256) downlink physical channel carrying the uplink E-DCH absolute grant. Its frame and subframe structure is illustrated in FIG. 3.

Figure 3:
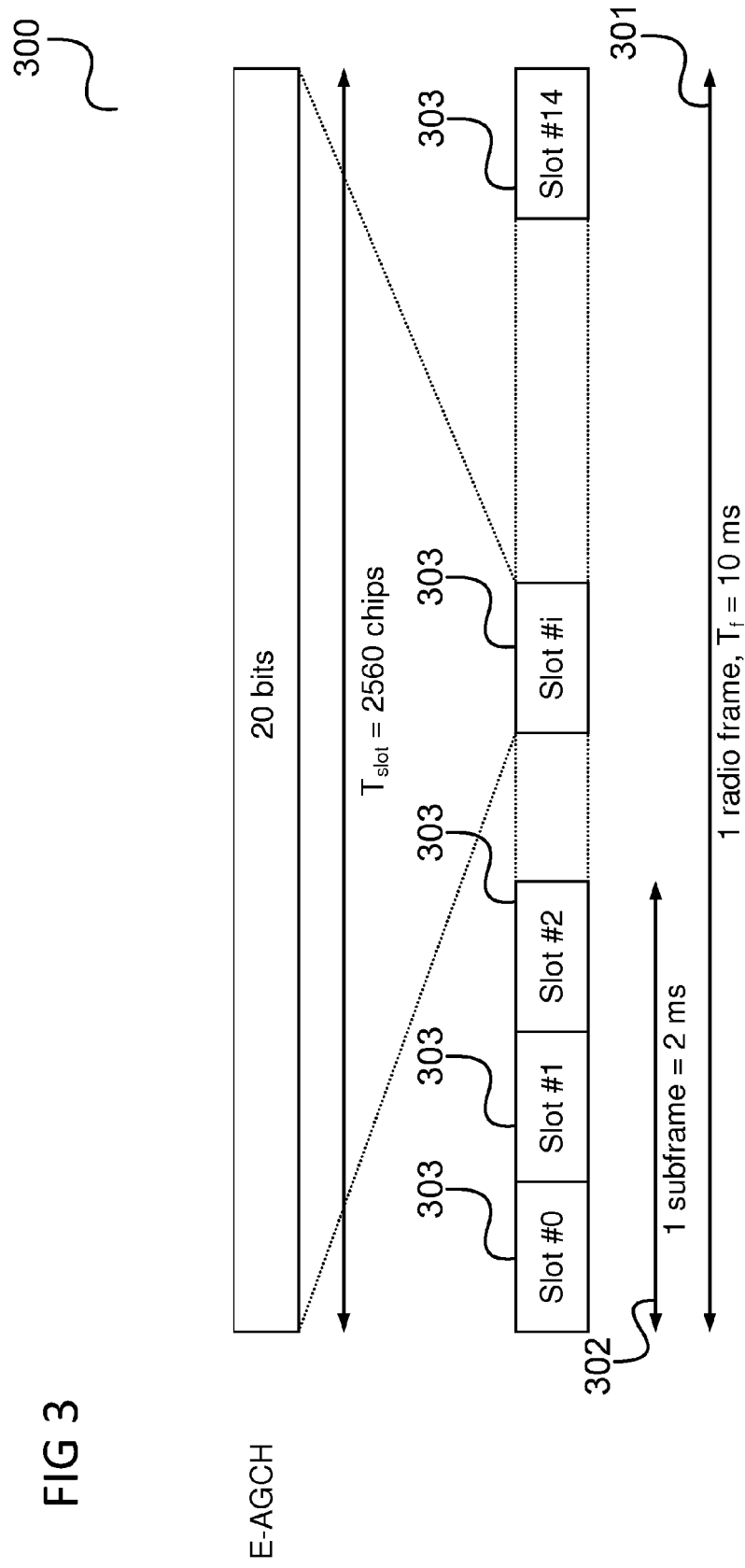
FIG. 3 shows a frame structure according to an embodiment.

FIG. 3 shows a frame structure 300 according to an embodiment.

According to the E-AGCH frame structure, a radio frame 301 (with a length of 10 ms) includes 5 subframes 302 (with a length of 2 ms). Each subframe 302 includes three slots 303 such that the radio frame 301 includes 15 slots 303 (numbered from 0 to 14 in FIG. 3). Each slot 303 has a length of 2560 chips and can be used to transmit 20 bits of information.

An E-DCH absolute grant may be transmitted over one E-AGCH subframe 302 of length 2 ms or one E-AGCH frame 301 of length 10 ms. For example, the E-AGCH may carry on a subframe 302 a number of 60 channel coded bits and 22 information bits including The Absolute Grant Scope: 1 bit, which indicates whether the Absolute Grant is applicable to "Per HARQ process" or "All HARQ processes".

The Absolute Grant Value: 5 bits, which indicate the maximum E-DPDCH/DPCCH power ratio that the communication terminal 118 is allowed to use in the next transmission.

A CRC-specific masked E-RNTI (E-DCH Radio Network Temporary Identity) of length 16 bits.

According to one embodiment, in accordance with UMTS, the transmission duration of the E-AGCH is same as the E-DCH TTI, i.e. 2 ms or 10 ms. In case of 2 ms the E-AGCH carries only a single E-DCH absolute grant, whereas in case of 10 ms the E-AGCH carries a single E-DCH absolute grant which is transmitted in all 5 subframes 302 of the E-AGCH frame 301. On timing an E-AGCH frame is offset relative to the radio frame structure of the radio cell (i.e. the System Frames) with T1=5120 chips (≈1.33 ms) and 1 chip=0.261 μs.

In one embodiment, in accordance with UMTS, a fixed timing association is specified between the E-DCH absolute grant received in downlink by the communication terminal 118 and a corresponding E-DPDCH transmission in uplink carried out by the communication terminal 118. In other words, each E-DCH absolute grant is associated with a specific E-DCH TTI (and thus with a specific HARQ process since each TTI is associated with one HARQ process). The communication terminal 118, upon detection of an E-DCH absolute grant on E-AGCH intended for the communication terminal 118, carries out the transmission on the E-DPDCH in the associated TTI (i.e. carries out the transmission on the E-DPDCH in the associated HARQ process) based on the E-AGCH information received.

Figure 4:
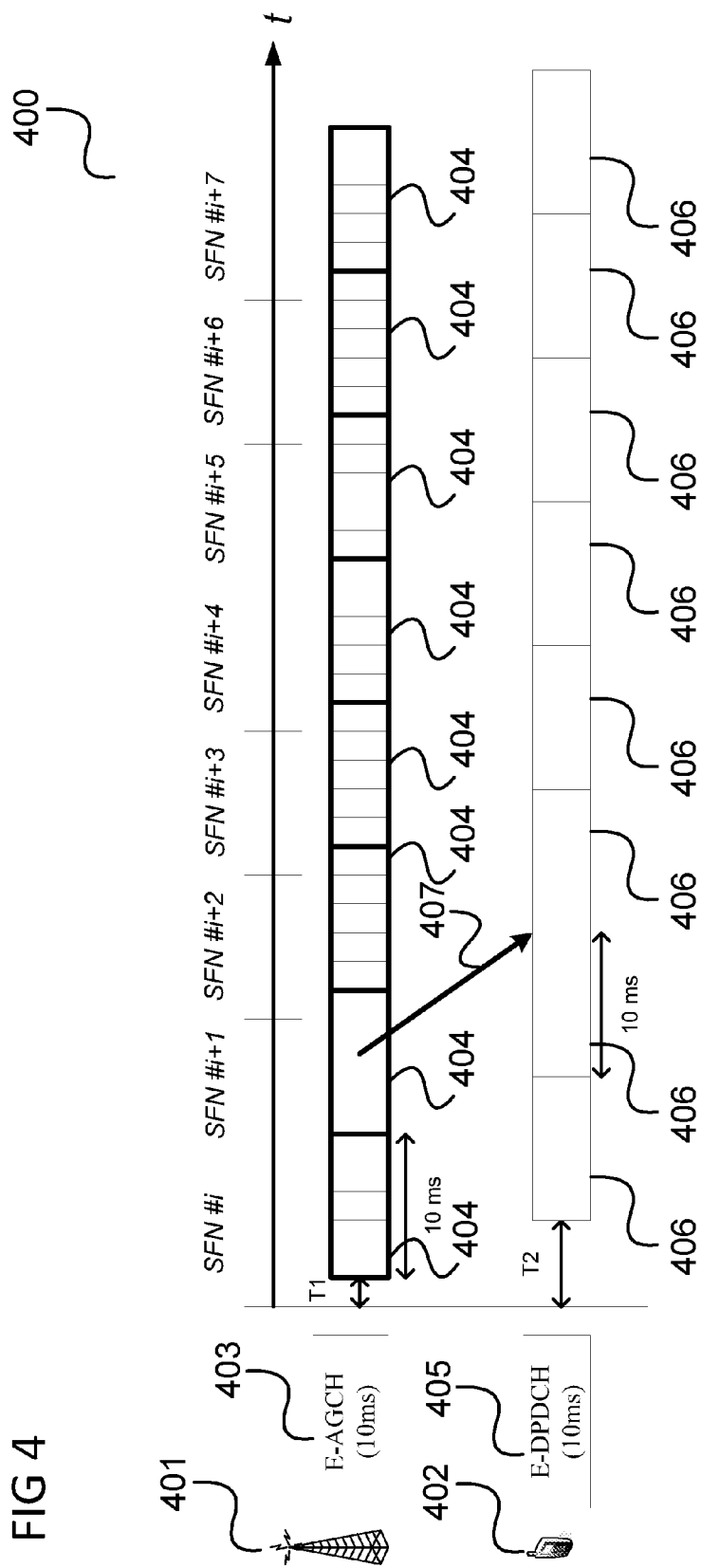
FIG. 4 shows a transmission diagram according to an embodiment.
Figure 5:
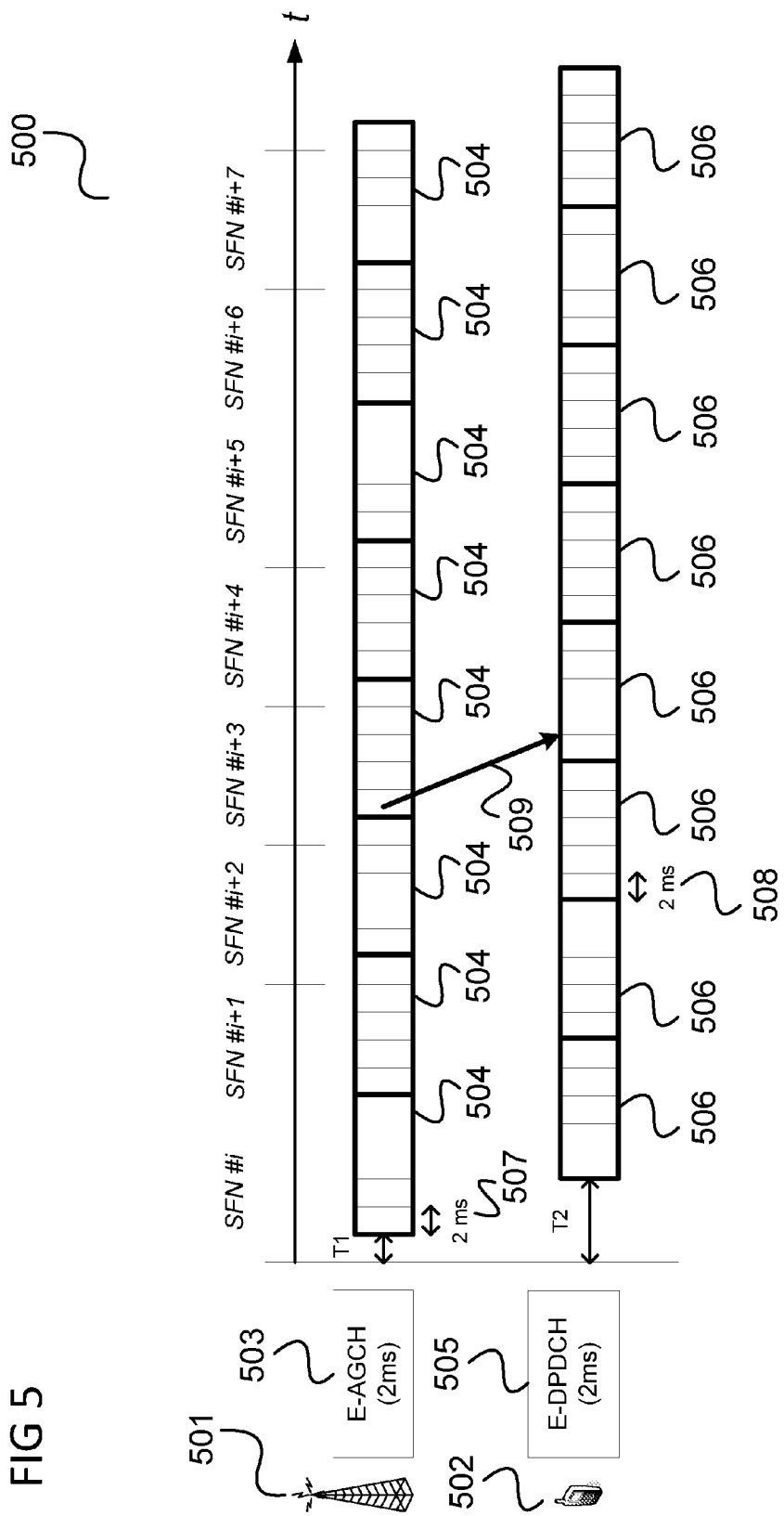
FIG. 5 shows a transmission diagram according to an embodiment.

This is illustrated in FIG. 4 for the 10 ms case (of E-AGCH transmission duration) and in FIG. 5 for the 2 ms case transmission duration (of E-AGCH transmission duration).

FIG. 4 shows a transmission diagram 400 according to an embodiment.

The illustrated transmission is carried out between a base station 401, e.g. corresponding to one of the base stations 108, 109, 110, 111, and a communication terminal 402, e.g. corresponding to the communication terminal 118. The base station 401 transmits the E-AGCH 403 with a transmission duration of 10 ms. Thus, the transmission duration corresponds to the frame length of a plurality of E-AGCH frames 404 (in accordance with the frame 301 as illustrated in FIG.

3). Each E-AGCH frame 404 is associated with a System Frame and thus a SFN (System Frame Number), in this example one of #i, #i+1, . . . , #i+7, wherein each E-AGCH frame 404 has a time offset of T1 with respect to its associated System Frame.

The communication terminal 402 transmits the E-DPDCH 405, also with a transmission duration of 10 ms, i.e. with TTIs of length 10 ms. Similarly to the E-AGCH frames 404, each TTI (or, in other words, each E-DPDCH frame 406 of E-DCH transmission) is associated with a System Frame and thus a SFN, wherein each E-DPDCH frame 406 has a time offset of T2 with respect to its associated System Frame.

In this example, an E-AGCH frame 404 associated with a SFN #i corresponds to (i.e. is associated with) an E-DCH transmission in the E-DPDCH frame 406 associated with SFN#i+1+s.

This means that information transmitted in the E-AGCH frame 404 associated with SFN#i by the base station 401 is taken into account by the communication terminal 402 for the E-DCH transmission in the E-DPDCH frame 406 associated with SFN#i+1+s as indicated by arrow 407.

FIG. 5 shows a transmission diagram 500 according to an embodiment.

The illustrated transmission is carried out between a base station 501, e.g. corresponding to one of the base stations 108, 109, 110, 111, and a communication terminal 502, e.g. corresponding to the communication terminal 118. The base station 501 transmits the E-AGCH 503 with a transmission duration of 2 ms. Thus, the transmission duration corresponds to the length of a plurality of E-AGCH subframes 507 (in accordance with the subframes 302 as illustrated in FIG. 3). Each E-AGCH subframe 507 is part of a E-AGCH frame 504 (in accordance with the frame 301 as illustrated in FIG. 3). Each E-AGCH frame 504 includes five subsequent E-AGCH subframes 507. Each E-AGCH frame 504 is associated with a System Frame and thus a SFN (System Frame Number), in this example one of #i, #i+1, . . . , #i+7, wherein each E-AGCH frame 504 has a time offset of T1 with respect to its associated System Frame.

The communication terminal 502 transmits the E-DPDCH 505, also with a transmission duration of 2 ms, i.e. with TTIs of length 2 ms corresponding to E-DPDCH subframes 508. Similarly to the E-AGCH frames 504, each of a plurality of E-DPDCH frames 506, including five E-DPDCH subframes 508, is associated with a System Frame and thus a SFN, wherein each E-DPDCH frame 506 has a time offset of T2 with respect to its associated System Frame.

In this example, an E-AGCH subframe #j of the E-AGCH frame 504 associated with a SFN #i corresponds to an E-DCH transmission in the E-DPDCH subframe #t of the E-DPDCH frame 506 associated with SFN#i+s.

This means that information transmitted in the E-AGCH subframe #j of the E-AGCH frame 504 by the base station 501 is taken into account by the communication terminal 502 for the E-DCH transmission in the E-DPDCH subframe #t of the E-DPDCH frame 506 associated with SFN#i+s as indicated by arrow 509.

The value of s in the examples described with reference to FIGS. 4 and 5 depends on the communication terminal-specific E-DPDCH timing. For example, in CELL_DCH state the E-DPDCH timing is configurable with T2=Tn×256+1024 chips with Tn={0, . . . , 149}.

According to one embodiment, in accordance with UMTS, for E-DCH an N-channel Stop & Wait HARQ mechanism is used between the communication terminal 118 and the NodeB 108, 109, 110, 111 with N=8 for 2 ms E-DCH TTI and N=4 for 10 ms E-DCH TTI.

A "channel" (or subchannel) in the context of HARQ refers to periodically allocated transmission intervals of length 2 ms or 10 ms (depending on the TTI length). The data transmission in accordance to HARQ within a "channel" is associated with a HARQ process. For example, in case of 2 ms E-DCH TTI 8 HARQ processes are established in the communication terminal 118 and the available TTIs are periodically allocated to the HARQ processes in accordance with an ordering of the HARQ processes, such that in a first TTI, data is transmitted by the first HARQ process, in a following TTI, data is transmitted by the second HARQ process and so on until after the data transmission by the eighth HARQ process in a TTI data are again transmitted in a TTI by the first HARQ process.

In accordance to HARQ each transmission of data (control data on DCCH logical channel or user data on DTCH logical channel mapped to E-DCH) in a transport block in a TTI is positively acknowledged (with an ACK message) or negatively acknowledged (with a NACK message) by the NodeB 108, 109, 110, 111, i.e. the information is sent whether the transport block has been successfully received by the NodeB 108, 109, 110, 111 or not. If a transport block transmitted by a HARQ process has been successfully received by the base station 108, 109, 110, 111, the communication terminal 118 is expected to send a new transport block in the next TTI associated with the HARQ process. If the transport block has not been successfully received by the NodeB 108, 109, 110, 111 the communication terminal 118 is expected to re-transmit the transport block in the next TTI associated with the HARQ process.

In case of retransmission the NodeB 108, 109, 110, 111 stores the erroneously received transport block. This stored transport block is then soft combined with the retransmitted transport block and jointly decoded. With each HARQ retransmission the code rate is decreased on one hand, but on the other hand the error correction capability is increased as with every retransmission additional redundancy information is received for channel decoding. A fixed timing association is specified between the transport block transmitted in uplink by the communication terminal 118 and the corresponding ACK/NACK transmission in downlink by the NodeB 108, 109, 110, 111.

According to UMTS, in the uplink the communication terminal 118 can request E-DCH resources from the NodeB 108, 109, 110, 111 by sending a Scheduling Information (SI) which is used to provide the NodeB 108, 109, 110, 111 with a better view of the amount of resources needed by the communication terminal 118 and the amount of resources it can actually make use of. The transmission of the SI may be initiated by triggers (i.e. based on events and/or periodic timer) defined by the UTRAN 101, 102. The SI can be sent alone or together with DCCH/DTCH data in a transport block. The SI contains in total 18 bits and includes the following fields as shown in table 1.

The Highest Priority Logical Channel ID (HLID) identifies unambiguously the highest priority logical channel with available data. If multiple logical channels exist with the highest priority, the one corresponding to the highest buffer occupancy will be reported. The length of this field is 4 bits.

The Total E-DCH Buffer Status (TEBS) identifies the total amount of data available across all logical channels for which reporting has been requested by the RRC and indicates the amount of data in number of bytes that is available for transmission and retransmission in RLC layer. The length of this field is 5 bits.

The Highest priority Logical channel Buffer Status (HLBS) indicates the amount of data available from the logical channel identified by HLID. The length of this field is 4 bits.

The UE Power Headroom (UPH) indicates the ratio of the maximum UE transmission power and the corresponding DPCCH code power. The length of this field is 5 bits.

TABLE 1

Scheduling Information format

| UPH | TEBS | HLBS | HLID |
|---|---|---|---|
| (5 bits) | (5 bits) | (4 bits) | (4 bits) |

As the 2 ms E-DCH TTI allows for higher uplink data rates and lower data transmission delay compared to the 10 ms E-DCH TTI, HARQ process activation/deactivation in case of 2 ms E-DCH TTI enables the NodeB 108, 109, 110, 111 to schedule E-DCH resources in a very flexible manner and control interference of uplink transmissions. HARQ process activation/deactivation may be performed by the NodeB 108, 109, 110, 111 using the E-AGCH and when the communication terminal 118 is configured with the so-called primary E-RNTI. When the communication terminal 118 receives information via the E-AGCH associated with a certain TTI and with a certain HARQ process (as explained with reference to FIGS. 4 and 5) then the procedure for activating/deactivating of HARQ processes may be carried out according to table 2.

TABLE 2

| Case | Absolute Grant Scope | Absolute Grant Value | HARQ process status |
|---|---|---|---|
| 1 | "Per HARQ process" | "INACTIVE" | Deactivates the affected (i.e. associated) HARQ process only |
| 2 | "All HARQ processes" | "INACTIVE" | Deactivates all HARQ processes |
| 3 | "Per HARQ process" | unequal "INACTIVE" | Activates the affected HARQ process only |
| 4 | "All HARQ processes" | unequal "INACTIVE" | Activates all HARQ processes |

In 3GPP standard Release 8 the performance of the random access procedure in Idle Mode and CELL_FACH state for the UMTS FDD mode based on W-CDMA was improved in terms of capacity, throughput and transmission delay. The improvements were achieved by using the E-DCH transport channel in Idle Mode and CELL_FACH state as common resource in conjunction with closed-loop power control, NodeB controlled scheduling, HARQ, and 2 ms and 10 ms TTI lengths.

In one embodiment, in accordance with 3GPP Release 8, in each radio cell up to 32 common E-DCH resources can be configured which are broadcast to all mobile terminals 118 in the radio cell. In detail, the configuration of common E-DCH resources in the radio cell is broadcast to the communication terminals 118 in the System Information Block (SIB) 5/5bis in the Information Element "Common E-DCH system info".

According to 3GPP Release 8, the common E-DCH scheduling operation in Idle Mode and CELL_FACH state is slightly different compared to the E-DCH scheduling operation in CELL_DCH state:

For DCCH/DTCH transmission by the communication terminal 118 in CELL_FACH state the E-DCH scheduling is based on scheduling grants received from the NodeB 108, 109, 110, 111 on E-AGCH and E-RGCH, whereas for CCCH transmission in Idle Mode and CELL_FACH state the E-DCH scheduling is based only on an initial serving grant value, i.e. the communication terminal 118 does not monitor the E-AGCH and E-RGCH.

HARQ process activation/deactivation is not supported according to 3GPP Release-8 as no need was seen for having this.

The NodeB 108, 109, 110, 111 has the possibility to explicitly release a common E-DCH resource allocated to the communication terminal 118 by sending a message on the E-AGCH to the communication terminal 118 with its primary E-RNTI with Absolute Grant Scope="All HARQ processes" and Absolute Grant Value="INACTIVE".

In context of the (current) 3GPP Release 11 time frame further UL/DL (Uplink/Downlink) improvements in terms of resource utilization, throughput, latency and coverage as well as UE (User Equipment, i.e. communication terminal) battery life improvements and signaling reduction are currently discussed in 3GPP as part of the Release 11 work item on "Further enhancements to CELL_FACH". Objective of the work item is to further enhance the CELL_FACH state to ensure that communication terminals with low to medium packet data activity can operate in CELL_FACH with a similar performance, coverage and battery consumption as in other RRC states.

One candidate technique for further improving the uplink performance in CELL_FACH state is the support of per-HARQ-process grants for common E-DCH configured with 2 ms TTI, i.e. the support of HARQ process activation/deactivation for the common E-DCH configured with 2 ms TTI for improving NodeB controlled scheduling. The introduction of HARQ process activation/deactivation for 2 ms TTI would help the radio access network 101, 102 to do better resource utilization and to have a better control over the common E-DCH resources of the radio cell.

Figure 6:
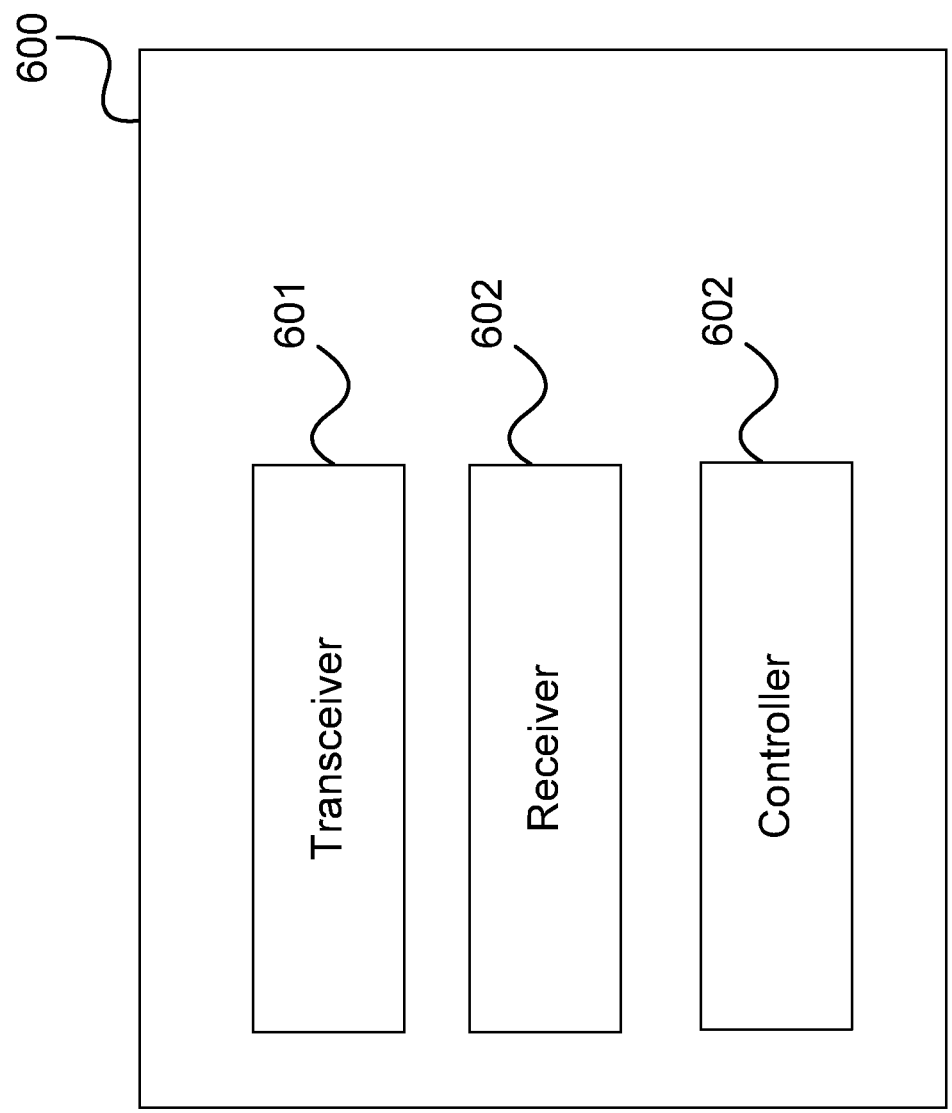
FIG. 6 shows a communication terminal according to an embodiment.

Accordingly, according to one embodiment, a way to support HARQ process activation/deactivation for the common E-DCH configured with 2 ms TTI in CELL_FACH state is provided, e.g. by means of a communication terminal as illustrated in FIG. 6.

FIG. 6 shows a communication terminal 600 according to an embodiment.

The communication terminal 600 comprises a transceiver 601 configured to transmit data in accordance with a plurality of transmission processes wherein each transmission process may be activated or deactivated.

The communication terminal 600 further comprises a receiver 602 configured to receive a message including a message field which specifies a number of transmission processes to which a request for transmission process activation or deactivation is to be applied.

Further, the communication terminal 600 comprises a controller 603 configured to activate or deactivate the number of transmission processes in accordance with the request.

In other words, according to one embodiment, a communication terminal receives information about how many transmission processes (e.g. HARQ processes) should be activated or deactivated in accordance with an activation/deactivation request.

For example, in case of an UMTS communication system such as shown in FIG. 1, this allows flexible activation/deactivation of HARQ processes for E-DCH transmission in CELL_FACH state such that the radio access network can flexibly control the common E-DCH resources of the radio cell for bursty data traffic in CELL_FACH state.

According to one embodiment, the transmission processes are transmission processes for transmitting data between the communication terminal and a communication device.

The communication device is for example a base station.

The transceiver is for example configured to transmit data in accordance with a plurality of transmission processes in uplink.

In one embodiment, the transceiver is configured to transmit data in accordance with a plurality of transmission processes using a communication channel shared with at least one other communication terminal. In one embodiment, for example, the communication terminal is operated in a state (e.g. in an RRC state) in which the transceiver is configured to transmit data in accordance with the plurality of transmission processes using common communication resources, e.g. in CELL_FACH state.

The transmission processes are for example automatic repeat request processes, for example hybrid automatic repeat request processes.

In one embodiment, the message field includes an integer specifying the number of transmission processes to which the request is to be applied.

The transmission processes are for example transmission processes established in the communication terminal.

In one embodiment, the message further comprises a further message field with information allowing to determine the first transmission process of the plurality of transmission processes to be activated or deactivated based on the transmission process associated with the request for transmission process activation or deactivation and the number of transmission processes.

The further message field may specify an offset between the transmission process associated with the request for transmission process activation or deactivation and the first transmission process of the transmission processes to be activated or deactivated.

In one embodiment, the transmission processes have an ordering and the transceiver is configured to carry out data transmissions in accordance with a plurality of time transmission intervals and each time transmission interval is allocated with one of the transmission processes in accordance to the ordering of transmission processes.

The receiver is for example further configured to receive the request for transmission process activation or deactivation.

In one embodiment, when a transmission process is deactivated, the communication terminal does not transmit data via the transmission process.

In one embodiment, for each transmission process, communication resources are allocated and when a transmission process is deactivated, the communication terminal does not transmit data using the communication resources allocated with the transmission process.

The communication resources are for example transmission time intervals.

In one embodiment, the message includes a further message field specifying that an equal number of transmission processes subsequent (e.g. according to an ordering of the transmission processes) to the number of transmission processes should be activated if according to the request the number of transmission processes should be deactivated and that an equal number of transmission processes subsequent to the number of transmission processes should be deactivated if according to the request the number of transmission processes should be activated. In other words, the further message field may specify that a transmission process swapping is to be carried out.

The communication terminal is for example a subscriber terminal of a cellular mobile communication system.

Figure 7:
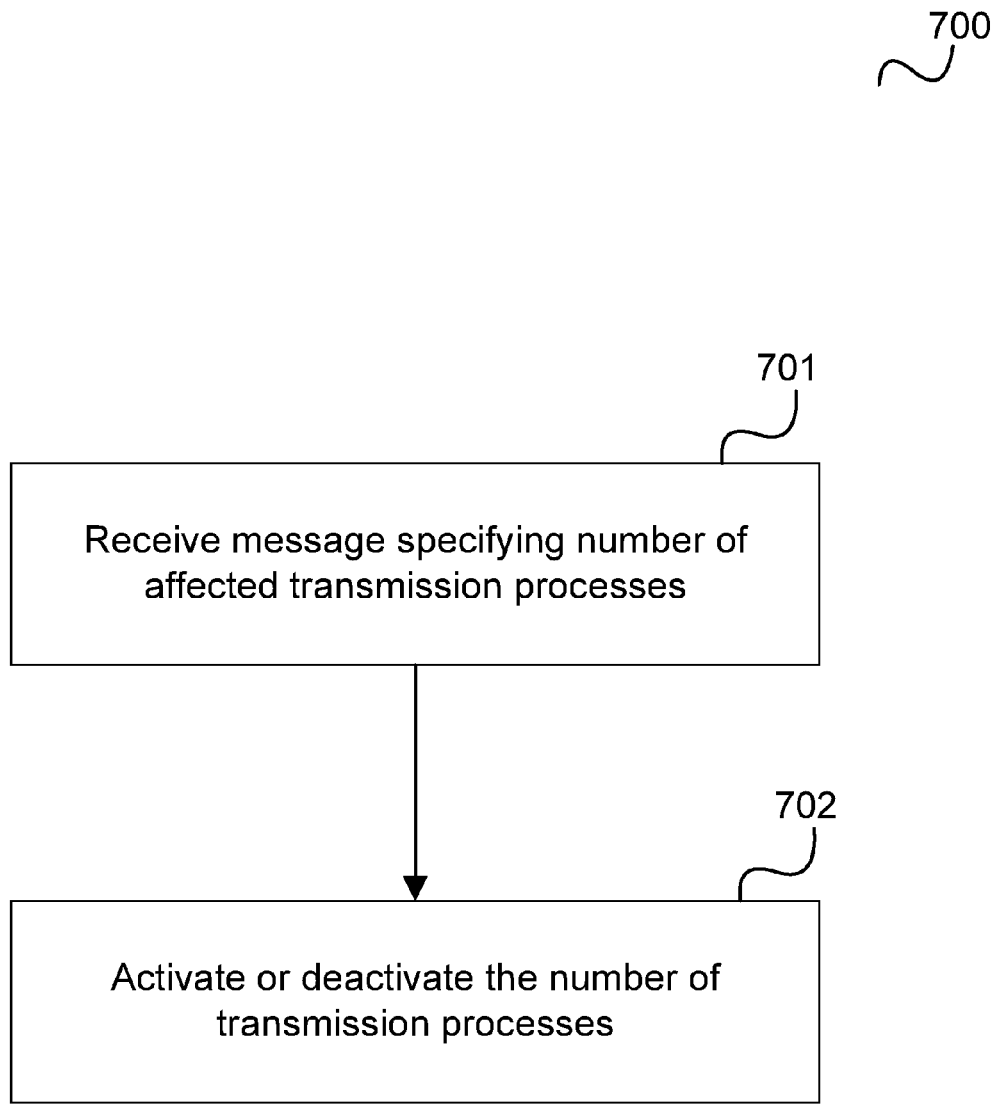
FIG. 7 shows a flow diagram according to an embodiment.

The communication terminal 600 for example carries out a method as illustrated in FIG. 7.

FIG. 7 shows a flow diagram 700 according to an embodiment.

In 701, a communication terminal which transmits data in accordance with a plurality of transmission processes wherein each transmission process may be activated or deactivated receives a message including a message field which specifies a number of transmission processes to which a request for transmission process activation or deactivation is to be applied.

In 702, the number of transmission processes is activated or deactivated in accordance with the request.

Figure 8:
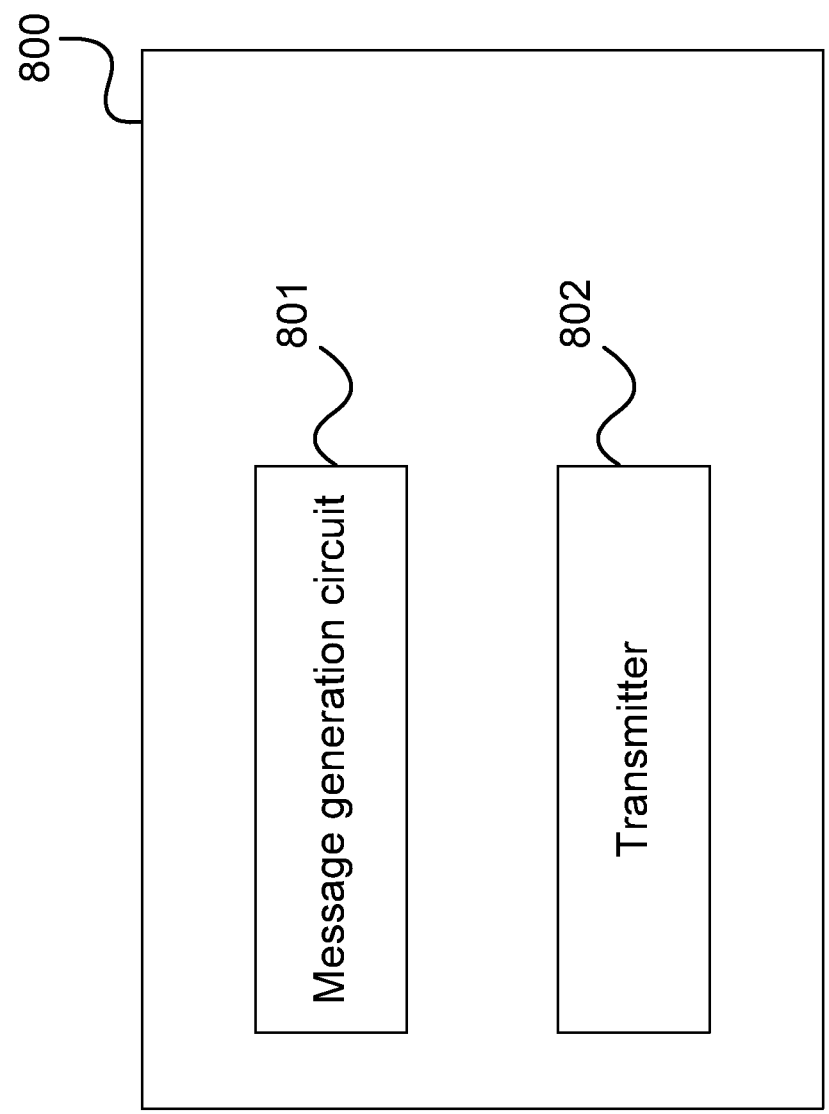
FIG. 8 shows a communication device according to an embodiment.

The communication terminal 600 for example communicates with a communication device as illustrated in FIG. 8.

FIG. 8 shows a communication device 800 according to an embodiment.

The communication device 800 comprises a message generation circuit 801 configured to generate a message including, for a plurality of transmission processes in accordance to which a communication terminal transmits data and which may each be activated or deactivated, a message field which specifies a number of transmission processes to which a request for transmission process activation or deactivation is to be applied.

The communication device 800 further comprises a transmitter 802 configured to transmit the message to the communication terminal.

The communication device 800 is for example a base station, e.g. of a cellular mobile communication system.

In one embodiment, the transmitter is further configured to transmit the request to the communication terminal.

Figure 9:
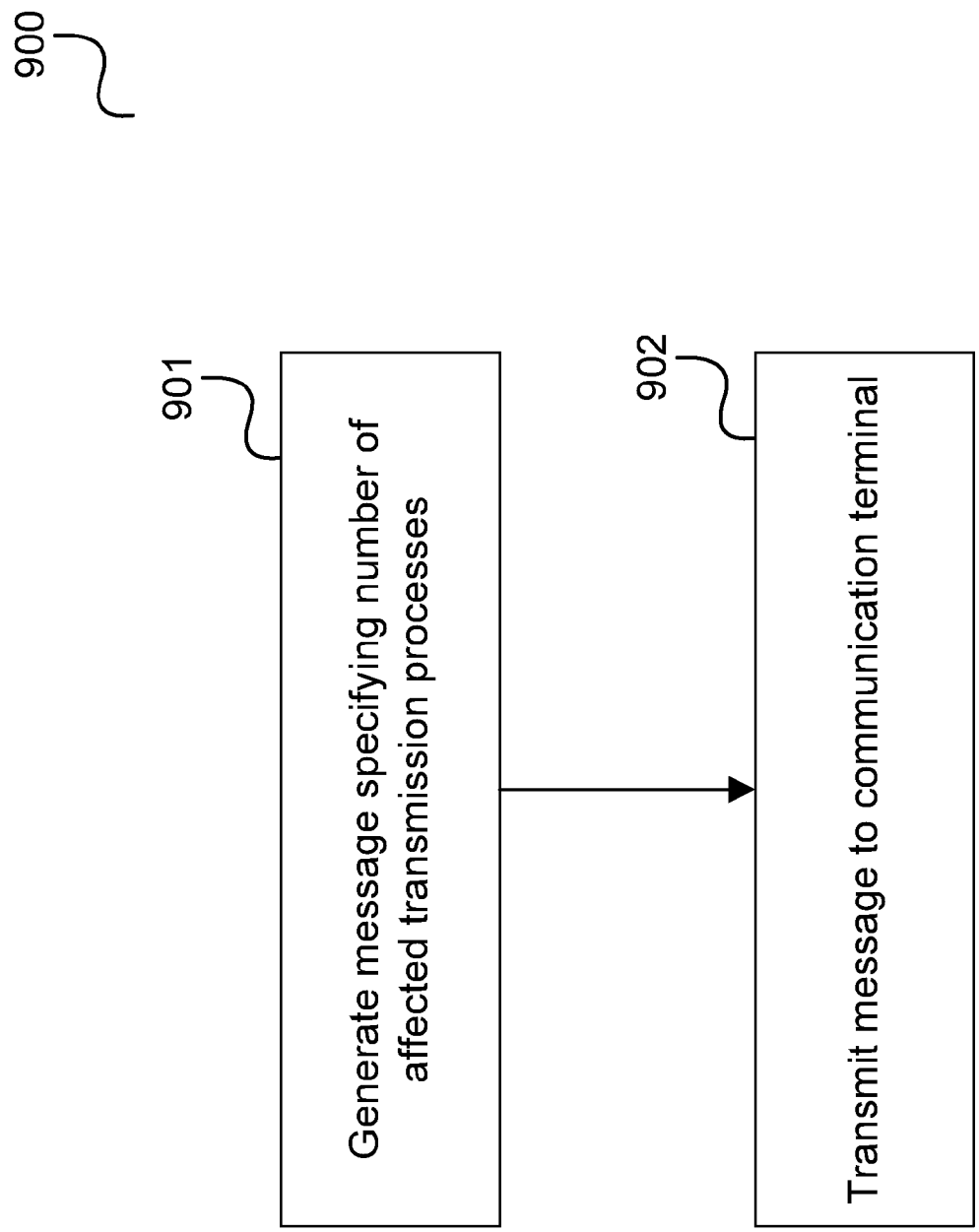
FIG. 9 shows a flow diagram according to an embodiment.

The communication device 800 for example carries out a method as illustrated in FIG. 9.

FIG. 9 shows a flow diagram according to an embodiment.

In 901, a message is generated including, for a plurality of transmission processes in accordance to which a communication terminal transmits data and which may each be activated or deactivated, a message field which specifies a number of transmission processes to which a request for transmission process activation or deactivation is to be applied.

In 902, the message is transmitted to the communication terminal.

A communication terminal according to another embodiment, which may be used independently or in combination with the embodiments described with reference to FIGS. 6 to 9 is described in the following with reference to FIG. 10.

Figure 10:
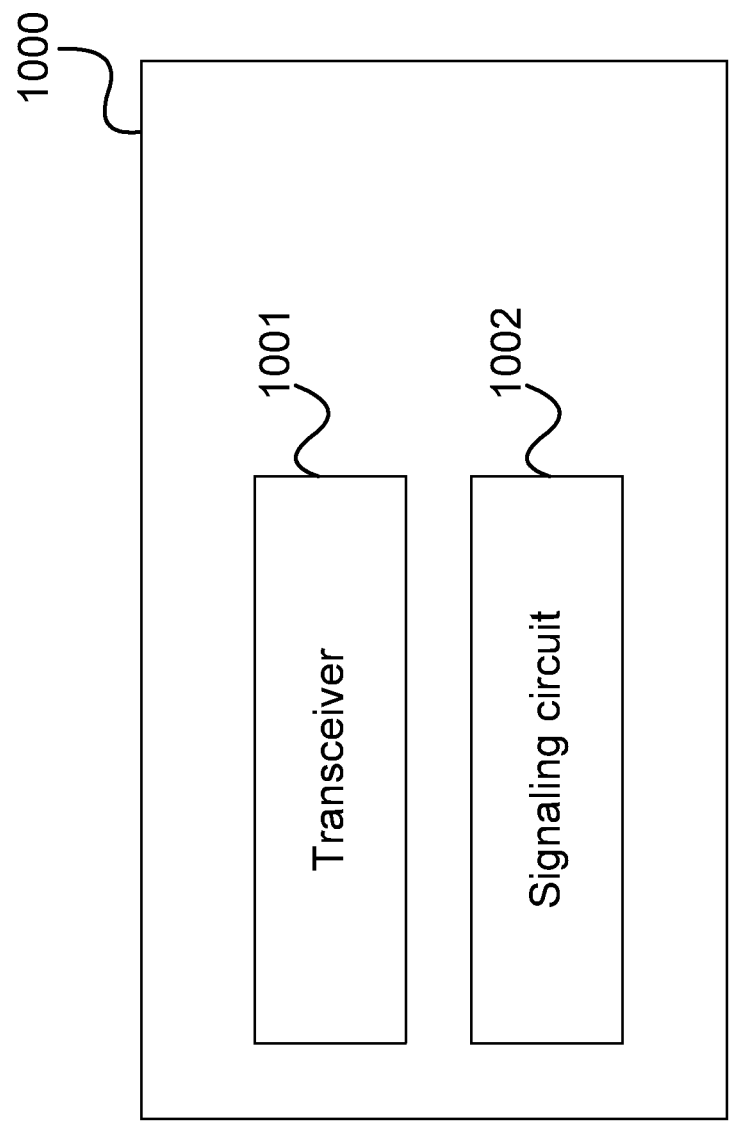
FIG. 10 shows a communication terminal according to an embodiment.

FIG. 10 shows a communication terminal 1000 according to an embodiment.

The communication terminal 1000 comprises a transceiver 1001 configured to transmit data in accordance with a plurality of transmission processes wherein each transmission process may be activated or deactivated.

The communication terminal 1000 further comprises a signaling circuit 1002 configured to transmit a message including a message field which indicates for at least one transmission process of the plurality of transmission processes whether the transmission process is activated or deactivated to a communication device.

According to one embodiment, in other words, a communication terminal reports (e.g. upon request from a communication device) the status (i.e. the activation status) of the transmission processes established on the communication terminal, e.g. in terms of, for each transmission process, whether the transmission process is activated or not on the communication terminal.

The communication terminal is for example a subscriber terminal of a cellular mobile communication system.

According to one embodiment, the communication device is a base station of a cellular mobile communication system.

In one embodiment, he message field indicates for each transmission process of the plurality of transmission processes whether the transmission process is activated or deactivated.

Figure 11:
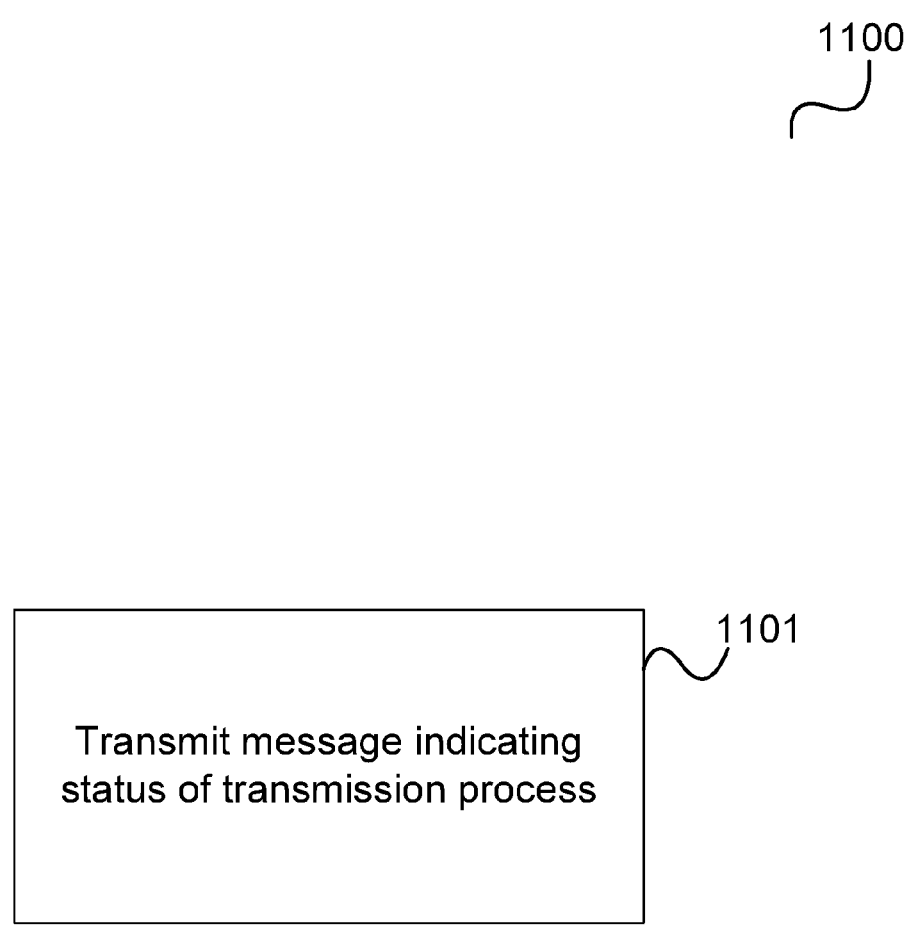
FIG. 11 shows a flow diagram according to an embodiment.

The communication terminal 1000 for example carries out a method as illustrated in FIG. 11.

FIG. 11 shows a flow diagram 1100 according to an embodiment.

In 1101 a message is transmitted to a communication device including a message field which indicates for at least one transmission process of a plurality of transmission processes in accordance to which a communication terminal transmits data wherein each transmission process may be activated or deactivated whether the transmission process is activated or deactivated.

Figure 12:
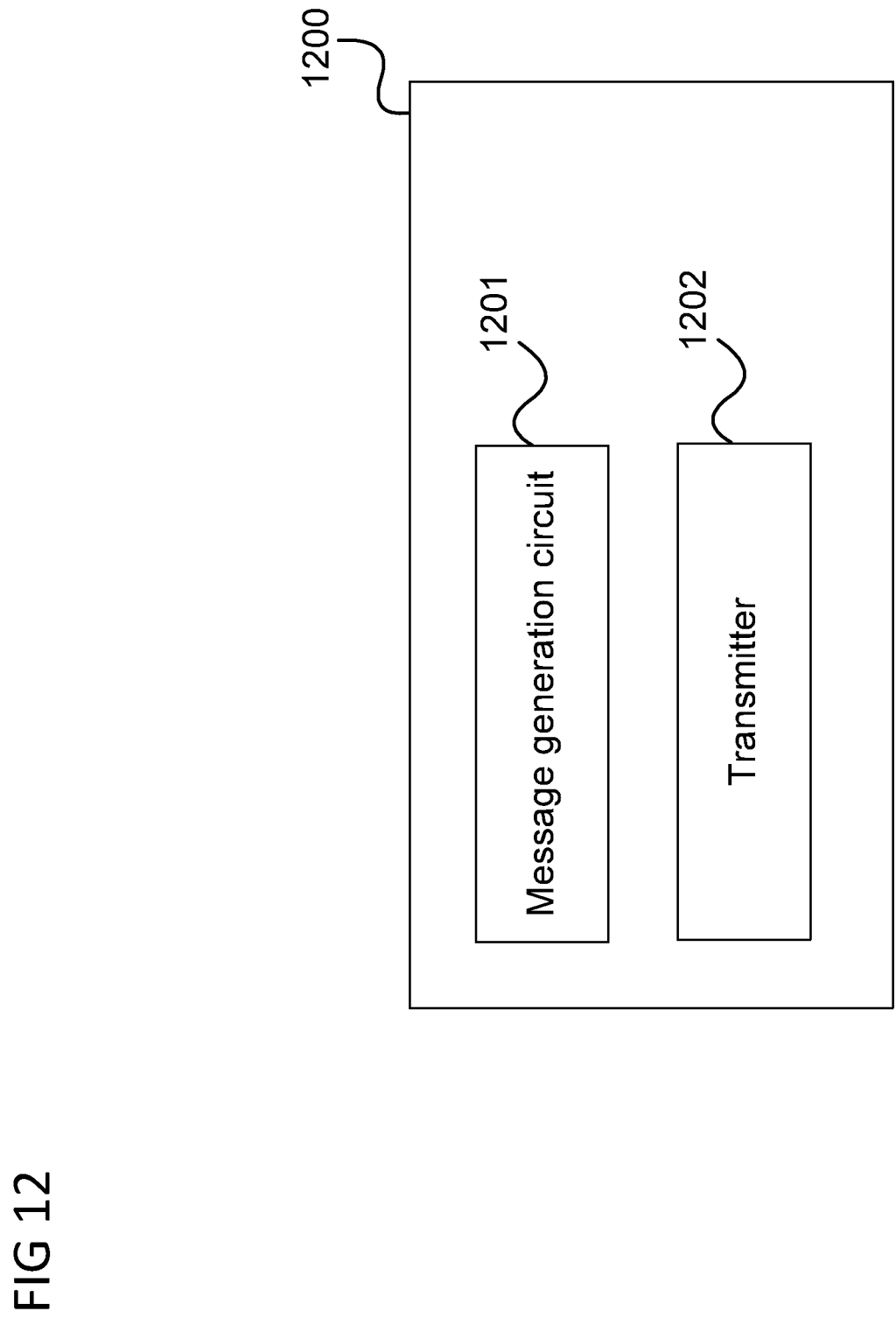
FIG. 12 shows a communication device according to an embodiment.

The communication terminal 1000 for example communicates with a communication device as illustrated in FIG. 12.

FIG. 12 shows a communication device 1200 according to an embodiment.

The communication device 1200 comprises a message generating circuit 1201 configured to generate a message indicating to a communication terminal that the communication terminal is to indicate, for at least one transmission process of a plurality of transmission processes according to which the communication terminal transmits data and which may each be activated or deactivated, whether the transmission process is activated or deactivated.

The communication device 1200 further comprises a transmitter 1202 configured to transmit the message to the communication terminal.

In one embodiment, the message indicates to the communication terminal that the communication terminal is to indicate, for each transmission process of the plurality of transmission processes whether the transmission process is activated or deactivated.

The communication device 1200 is for example a base station.

Figure 13:
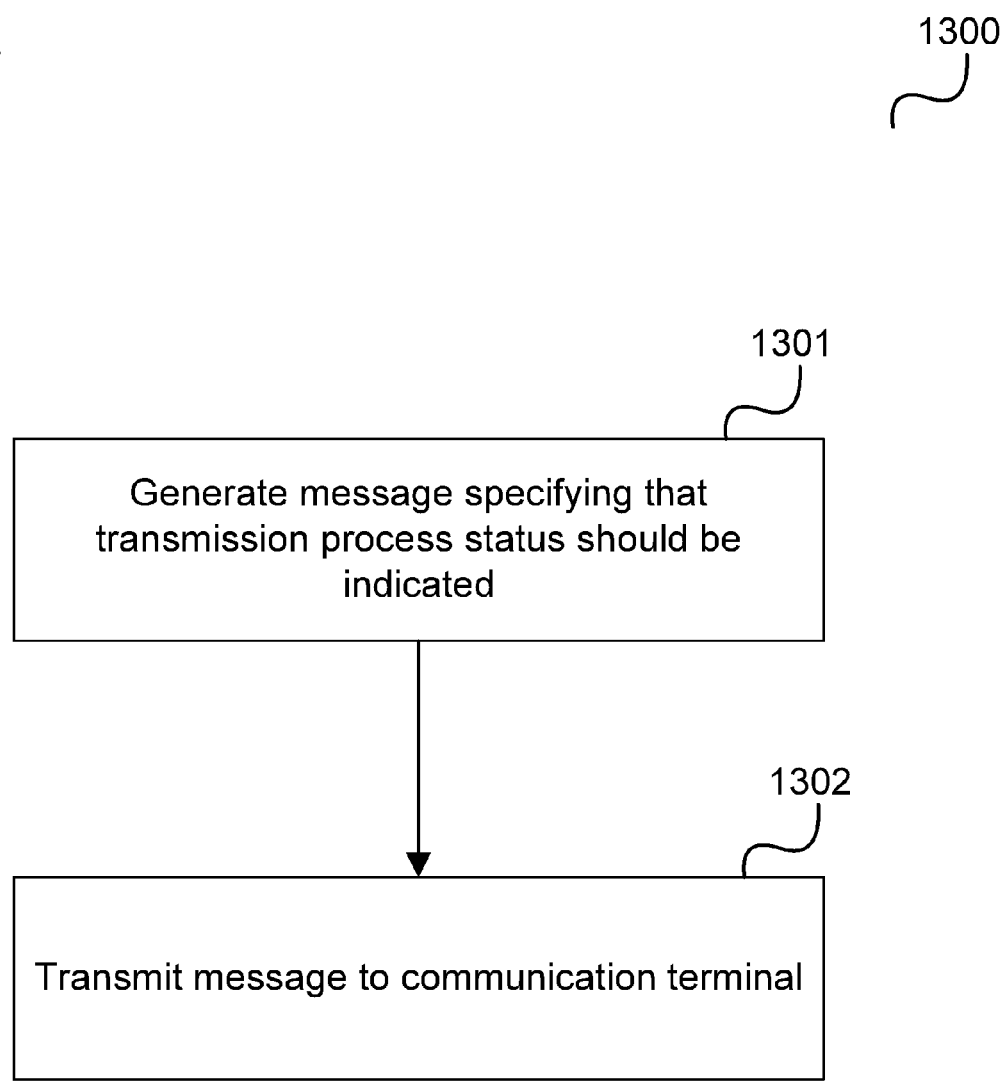
FIG. 13 shows a flow diagram according to an embodiment.

The communication device 1200 for example carries out a method as illustrated in FIG. 13.

FIG. 13 shows a flow diagram 1300 according to an embodiment.

In 1301, a message is generated indicating to a communication terminal that the communication terminal is to indicate, for at least one transmission process of a plurality of transmission processes according to which the communication terminal transmits data and which may each be activated or deactivated, whether the transmission process is activated or deactivated.

In 1302, the message is transmitted to the communication terminal.

It should be noted that embodiments described in context with a communication terminal are analogously valid for the other communication terminal, the communication devices, and the methods described above with reference to FIGS. 6 to 13 and vice versa.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the following, examples for the communication terminal, the communication device and the methods carried out by them in accordance with FIGS. 6 to 9 are described in the context of a communication system according to UMTS (e.g. as illustrated in FIG. 1) and the usage of HARQ processes.

It should be noted that according to UMTS as described above with reference to table 2, as the Absolute Grant Value="INACTIVE" in conjunction with Absolute Grant Scope="All HARQ processes" is used in Release 8 in CELL_ FACH state to explicitly release a common E-DCH resource allocated to the communication terminal 118 it can not be reused for HARQ process activation/deactivation. Therefore, according to one embodiment, it is proposed to extend the scope of the Absolute Grant Scope value "Per HARQ process" in accordance with the transmission, by the NodeB 108, 109, 110, 111, of information elements as shown in table 3 to the communication terminal 118 when Absolute Grant Scope is "Per HARQ process".

TABLE 3

| Information Element | Value | Comment |
| --- | --- | --- |
| Scope of Per HARQ process | Integer (1, 2, 3, 4, 5, 6, 7, 8) | Defines the number of HARQ processes affected by Absolute Grant Value. |
| HARQ process offset | Integer (0, 1, 2, 3) | Defines the offset of the HARQ processes affected by Absolute Grant Value, i.e. at which the HARQ process activation/deactivation shall take place. |
| HARQ process swapping | BOOLEAN | If set to "TRUE" then HARQ process swapping shall be applied as follows: If the communication terminal is to activate the affected HARQ processes as indicated by "Scope of Per HARQ process" and "HARQ process offset" then the communication terminal shall deactivate a number of HARQ processes as indicated by "Scope of Per HARQ process" subsequent to the HARQ processes to be activated. If the communication terminal is to deactivate the affected HARQ processes as indicated by "Scope of Per HARQ process" and "HARQ process offset" then the communication terminal shall activate a number of HARQ processes |

TABLE 3-continued

| Information Element | Value | Comment |
|---|---|---|
| | | as indicated by "Scope of Per HARQ process" subsequent to the HARQ processes to be deactivated. If set to "FALSE" then no swapping is applied |

It should be noted that the maximum number of HARQ processes is assumed to be 8, such that the Information Element Scope of Per HARQ process may have values from 1 to 8.

HARQ process swapping for example allows to signal that a number of HARQ processes as given by Scope of Per HARQ process are activated or deactivated and that the same number of HARQ processes which follow (according to the ordering of HARQ processes) the activated or deactivated HARQ processes is deactivated or activated, respectively. For example, if Scope of Per HARQ process is equal to 4, Absolute Grant Value is set to inactive and HARQ process swapping is set to true, the communication terminal will deactivate four HARQ processes (e.g. processes 0 to 3) and activate the subsequent four HARQ processes (e.g. processes 4 to 7).

The extension of Absolute Grant Scope value "Per HARQ process" in terms of the Information Elements as shown in table 3 may for example be signaled specifically to a communication terminal 118 by a dedicated RRC reconfiguration message after a common E-DCH resource has been successfully allocated to the communication terminal. Alternatively, the extension of Absolute Grant Scope value "Per HARQ process" in terms of the Information Elements as shown in table 3 may be signaled semi-statically as part of the Information Element "Common E-DCH system info" specific to a E-DCH resource or common to all E-DCH resources.

In the following, an example of the usage of the extended scope of the Absolute Grant Scope value "Per HARQ process" is described with reference to a UMTS communication system as for example illustrated in FIG. 1. The communication system 100 is in the following assumed to operate in UMTS FDD mode based on W-CDMA and the communication terminal 118 and the radio access network 101, 102 (i.e. the UTRAN) are assumed to support common E-DCH and enhanced E-DCH scheduling operation in CELL_FACH state.

Further, it is assumed that in the radio cell in where the communication terminal 118 is located overall 32 common E-DCH resources with 2 ms TTI are configured and broadcast as system information on BCH by the NodeB 108, 109, 110, 111. Additionally, it is assumed that the communication terminal 118 has successfully performed a random access procedure, so that a common E-DCH resource has been allocated to the UE by NodeB for DCCH/DTCH transmission in CELL_FACH state.

It is further assumed that the communication terminal 118 starts common E-DCH transmission with all 8 HARQ processes (which is assumed to be the maximum number of HARQ processes) activated.

Figure 14:
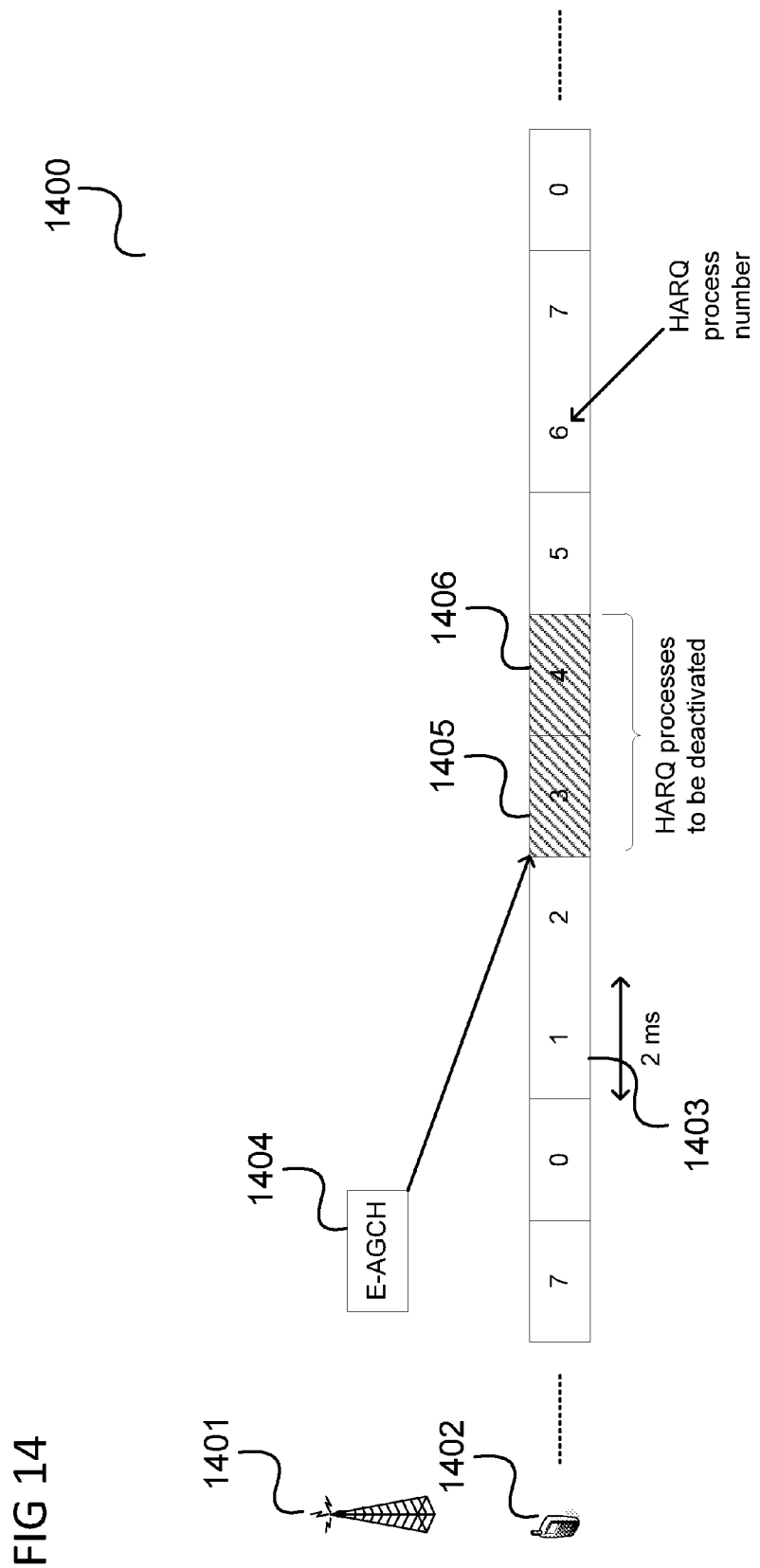
FIG. 14 shows a transmission diagram according to an embodiment.

The transmission flow of this example is illustrated in FIG. 14.

FIG. 14 shows a transmission diagram 1400 according to an embodiment.

The illustrated transmissions are carried out by a base station 1401, corresponding to a base station 108, 109, 110, 111, and a communication terminal 1402, corresponding to the communication terminal 118. In this example, each HARQ process (numbered from 0 to 7) are periodically associated with subframes 1403. The association of a subframe 1403 with a HARQ process is indicated by the number of the HARQ process.

It is assumed that the communication terminal 1402 receives a dedicated RRC reconfiguration message (not shown) including an extension of Absolute Grant Scope value "Per HARQ process" in terms of the Information Elements as shown in table 4.

TABLE 4

| Information Element | Value | Comment |
|---|---|---|
| Scope of Per HARQ process | 2 | 2 HARQ processes are affected |
| HARQ process offset | 0 | No offset |
| HARQ process swapping | "FALSE" | No swapping |

Accordingly, when the communication terminal 1402 receives an E-AGCH message 1404 including the communication terminal's primary E-RNTI, with the Absolute Grant Scope being set to "Per HARQ process" and Absolute Grant Value being set to "INACTIVE", the communication terminal 1402 deactivates two HARQ processes 1405, 1406, wherein the first deactivated HARQ process 1405 is assumed to be associated with the E-AGCH subframe in which the message 1404 is sent (as explained above with reference to FIG. 5), corresponding to the offset of 0 specified in the Information Element "HARQ process offset".

It should be noted that if HARQ process swapping would be set to true, the communication terminal 1402 would activate HARQ processes 5 and 6.

Another example is described in the following with reference to FIG. 15. The example is based on the communication system 100 with the same assumptions as described above with reference to FIG. 14.

Figure 15:
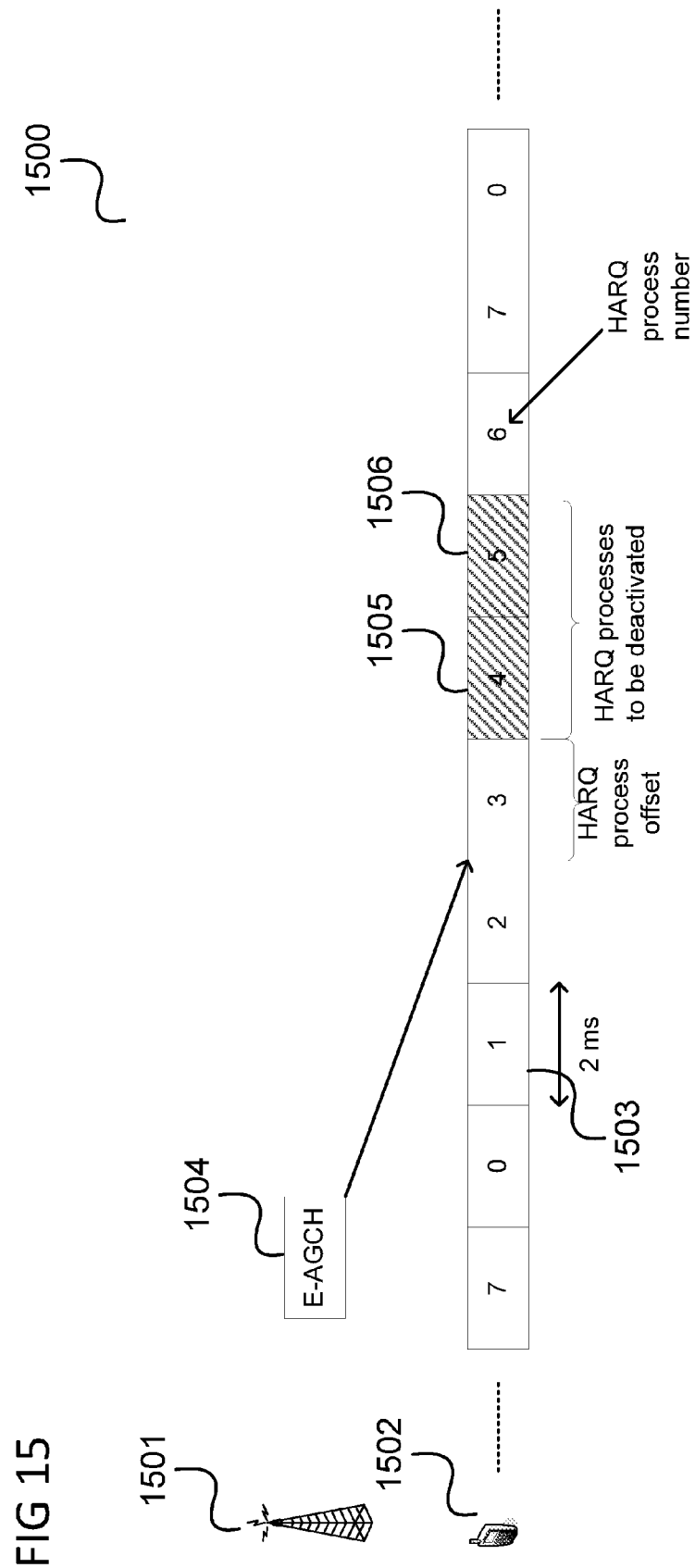
FIG. 15 shows a transmission diagram according to an embodiment.

FIG. 15 shows a transmission diagram 1500 according to an embodiment.

The illustrated transmissions are carried out by a base station 1501, corresponding to a base station 108, 109, 110, 111, and a communication terminal 1502, corresponding to the communication terminal 118. In this example, each HARQ process (numbered from 0 to 7) are periodically associated with subframes 1503. The association of a subframe 1503 with a HARQ process is indicated by the number of the HARQ process.

It is assumed that the communication terminal 1502 receives a dedicated RRC reconfiguration message (not shown) including an extension of Absolute Grant Scope value "Per HARQ process" in terms of the Information Elements as shown in table 5.

TABLE 5

| Information Element | Value | Comment |
|---|---|---|
| Scope of Per HARQ process | 2 | 2 HARQ processes are affected |
| HARQ process offset | 1 | An offset of 1 HARQ process is applied |
| HARQ process swapping | "FALSE" | No swapping |

Accordingly, when the communication terminal 1502 receives an E-AGCH message 1504 including the communication terminal's primary E-RNTI, with the Absolute Grant Scope being set to "Per HARQ process" and Absolute Grant Value being set to "INACTIVE", the communication terminal 1502 deactivates two HARQ processes 1505, 1506, wherein the first deactivated HARQ process 1505 is assumed to be associated with a subframe directly following the subframe associated with the E-AGCH subframe in which the message 1504 is sent (as explained above with reference to FIG. 5), in accordance with the offset of 1 specified in the Information Element "HARQ process offset".

In the following, examples for the communication terminal, the communication device and the methods carried out by them in accordance with FIGS. 10 to 13 are described in the context of a communication system according to UMTS (e.g. as illustrated in FIG. 1) and the usage of HARQ processes.

According to one embodiment, Scheduling Information referred to as "Scheduling Information Type 2" (for distinguishing it from the Scheduling Information illustrated in table 1) is used to provide the NodeB 108, 109, 110, 111 with a view of the amount of resources needed by the communication terminal 118, the amount of radio resources it can actually make use of, and the status of the HARQ processes (in terms of activation/deactivation) in the communication terminal 118. In one embodiment, the transmission of this Scheduling Information is initiated by an HS-SCCH (High Speed Shared Control Channel) order message transmitted by the NodeB 108, 109, 110, 111. This Scheduling Information can for example be sent alone or together with DCCH/DTCH data in a transport block. According to one embodiment, the Scheduling Information ("Type 2") includes in total 18 bits and includes the following fields as shown in Table 6.

The UE Power Headroom (UPH) which indicates the ratio of the maximum communication terminal transmission power and the corresponding DPCCH code power. The length of this field is 5 bits.

The Total E-DCH Buffer Status (TEBS) which identifies the total amount of data available across all logical channels for which reporting has been requested by the RRC and indicates the amount of data in number of bytes that is available for transmission and retransmission in RLC layer. The length of this field is 5 bits.

The HARQ Process Status (HPS) which indicates the status of the 8 HARQ processes of the allocated common E-DCH resource in terms of activation/deactivation. The field is defined as bitmap with length 8 bits, i.e. bit 0 corresponds to HARQ process number 0, bit 1 corresponds to HARQ process number 1 etc. If a HARQ process is activated then the bit value is set to "1", otherwise the bit value is set to "0".

TABLE 6

| Scheduling Information Type 2 format | | |
|---|---|---|
| UPH | TEBS | HPS |
| (5 bits) | (5 bits) | (8 bits) |

The HS-SCCH order message, according to one embodiment, is a command message sent by the NodeB 108, 109, 110, 111 to the communication terminal 118 for requesting the transmission of the Scheduling Information Type 2. The HS-SCCH order message is for example transmitted in accordance with the subframe structure of the HS-SCCH as introduced in 3GPP Release 5.

Figure 16:
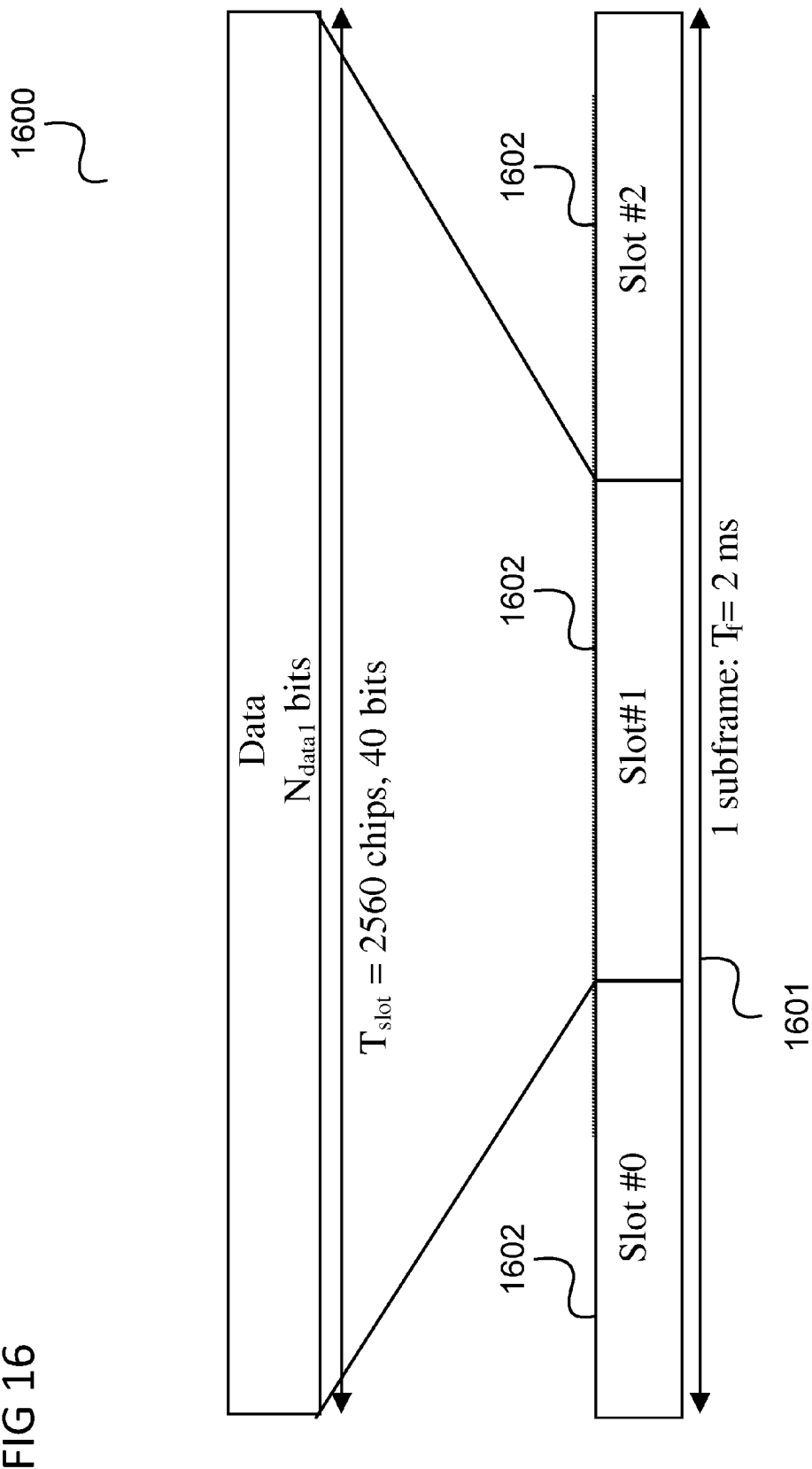
FIG. 16 shows a frame structure according to an embodiment.

This is illustrated in FIG. 16.

FIG. 16 shows a frame structure 1600 according to an embodiment.

The frame structure 1600 illustrates the HS-SCCH subframe structure according to an embodiment.

A subframe 1601 with a length of 2 ms includes three slots 1602, wherein each slot 1602 includes 40 channel encoded bits. In one embodiment, the HS-SCCH order message is transmitted over a subframe 1601 and thus carries 120 channel coded bits.

According to one embodiment, the following information is transmitted by means of the HS-SCCH order message:

An order for requesting the transmission of the new Scheduling Information Type 2, e.g. coded as 6 bit value The primary E-RNTI of length 16 bits as identity of the communication terminal 118.

In the following, an example for the request and reporting of HARQ process activation/deactivation status is described with reference to FIG. 17. The example is based on the communication system 100 with the same assumptions as described above with reference to FIG. 14.

FIG. 17 shows a message flow diagram 1700 according to an embodiment.

The message flow takes place between a communication terminal 1701 corresponding to the communication terminal 118 and a base station (NodeB) 1702 corresponding to the base station 108, 109, 110, 111.

In 1703, in order to keep track of the status of HARQ processes of the allocated common E-DCH resource the NodeB 1702 sends to the communication terminal 1701 an HS-SCCH order message 1704 for requesting the transmission of the Scheduling Information Type 2.

After reception of the HS-SCCH order message 1704 the communication terminal 1701 compiles (i.e. generates) the Scheduling Information Type 2 according to the structure as shown in table 6, namely including the UE Power Headroom (UPH), the Total E-DCH Buffer Status (TEBS) and the HARQ Process Status (HPS). In 1705, the communication terminal 1701 sends a Scheduling Information message 1706 including the generated Scheduling Information Type 2 to the base station 1702.

For example, the HARQ process status as illustrated in FIG. 14 is assumed here wherein the HARQ processes with numbers 3 and 4 are deactivated. As result, the communication terminal 1701 sends the HPS bitmap "[11100111]" to the NodeB 1702 on the Scheduling Information in the next possible TTI on E-DCH either alone or together with DCCH/DTCH data in a transport block.

It should be noted that an alternative approach to the extension of the Absolute Grant Scope value "Per HARQ process" as described above with reference to table 3 could be to assign a second E-RNTI, i.e. a secondary E-RNTI, to the communication terminal 118 in addition to the primary E-RNTI for the purpose of HARQ process activation/deactivation in case of 2 ms E-DCH TTI. According to this approach, the communication terminal 118 monitors in each TTI the E-AGCH in accordance with its two E-RNTIs. The NodeB 108, 109, 110, 111 may send to communication terminal 118 a message on the E-AGCH with its secondary E-RNTI for activating/deactivating HARQ processes with the settings (as currently specified in CELL_DCH state with the primary E-RNTI) in accordance with table 2.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication terminal comprising:
   a transceiver configured to transmit data in accordance with a plurality of transmission processes, wherein each transmission process is associated with a periodically allocated transmission interval and wherein each transmission process is activated or deactivated;
   a receiver configured to receive a message including a message field which specifies a number of transmission processes to which a request for transmission process activation or deactivation is to be applied; and
   controller configured to activate or deactivate the number of transmission processes in accordance with the request.

2. The communication terminal of claim 1, wherein the transmission processes are transmission processes for transmitting data between the communication terminal and a communication device.

3. The communication terminal of claim 2, wherein the communication device is a base station.

4. The communication terminal of claim 1, wherein the transceiver is configured to transmit data in accordance with a plurality of transmission processes in uplink.

5. The communication terminal of claim 1, wherein the communication terminal is operated in a state in which the transceiver is configured to transmit data in accordance with the plurality of transmission processes using common communication resources.

6. The communication terminal of claim 1, wherein the transmission processes are automatic repeat request processes.

7. The communication terminal of claim 1, wherein the transmission processes are hybrid automatic repeat request processes.

8. The communication terminal of claim 1, wherein the message field includes an integer specifying the number of transmission processes to which the request for transmission process activation or deactivation is to be applied.

9. The communication terminal of claim 1, wherein the message further comprises a further message field with information allowing to determine the first transmission process of the plurality of transmission processes to be activated or deactivated based on the transmission process associated with the request for transmission process activation or deactivation and the number of transmission processes.

10. The communication terminal of claim 1, wherein the transmission processes have an ordering and the transceiver is configured to carry out data transmissions in accordance with a plurality of time transmission intervals and each time transmission interval is allocated with one of the transmission processes in accordance to the ordering of transmission processes.

11. The communication terminal of claim 1, wherein the receiver is further configured to receive the request for transmission process activation or deactivation.

12. The communication terminal of claim 1, wherein when a transmission process is deactivated, the communication terminal does not transmit data via the transmission process.

13. The communication terminal of claim 1, wherein the message includes a further message field specifying that an equal number of transmission processes subsequent to the number of transmission processes should be activated if according to the request the number of transmission processes should be deactivated and that an equal number of transmission processes subsequent to the number of transmission processes should be deactivated if according to the request the number of transmission processes should be activated.

14. The communication terminal of claim 1, wherein the communication terminal is a subscriber terminal of a cellular mobile communication system.

15. A communication device comprising:
   a message generation circuit configured to generate a message including, for a plurality of transmission processes in accordance to which a communication terminal transmits data, wherein each transmission process is associated with a periodically allocated transmission interval and which is activated or deactivated, a message field which specifies a number of transmission processes to which a request for transmission process activation or deactivation is to be applied; and a transmitter configured to transmit the message to the communication terminal.

16. The communication device according to claim 15, being a base station.

17. The communication device of claim 16, wherein the communication device is a base station of a cellular mobile communication system.

18. The communication device according to claim 15, wherein the transmitter is further configured to transmit the request to the communication terminal.

19. A communication terminal comprising:
   a transceiver configured to transmit data in accordance with a plurality of transmission processes wherein each transmission process is associated with a periodically allocated transmission interval and wherein each transmission process is activated or deactivated; and
   a signaling circuit configured to transmit a message including a message field which indicates for at least one transmission process of the plurality of transmission processes whether the transmission process is activated or deactivated to a communication device.

20. The communication terminal of claim 19, wherein the communication terminal is a subscriber terminal of a cellular mobile communication system.

21. The communication terminal of claim 19, wherein the communication device is a base station of a cellular mobile communication system.

22. The communication terminal of claim 19, wherein the message field indicates for each transmission process of the plurality of transmission processes whether the transmission process is activated or deactivated.

23. A communication device comprising:
   a message generating circuit configured to generate a message indicating to a communication terminal that the communication terminal is to indicate, for at least one transmission process of a plurality of transmission processes wherein each transmission process is associated with a periodically allocated transmission interval and according to which the communication terminal transmits data and which is activated or deactivated, whether the transmission process is activated or deactivated; and
   a transmitter configured to transmit the message to the communication terminal.

24. The communication device of claim 23, being a base station.

25. The communication device according to claim 23, wherein the message indicates to the communication terminal that the communication terminal is to indicate, for each transmission process of the plurality of transmission processes whether the transmission process is activated or deactivated.

* * * * *